(12) United States Patent
Chon et al.

(10) Patent No.: US 12,446,919 B2
(45) Date of Patent: Oct. 21, 2025

(54) CANNULA ASSEMBLY

(71) Applicant: Alcon Inc., Fribourg (CH)

(72) Inventors: James Y. Chon, Irvine, CA (US); Jesus R. Gonzales, Jr., Wernersville, PA (US); Grace Chuang Liao, Irvine, CA (US); Hanspeter Naef, Enola, PA (US); Ashish Sinha, Irvine, CA (US); Mark Vojtasek, Reading, PA (US)

(73) Assignee: Alcon Inc., Fribourg (CH)

( * ) Notice: Subject to any disclaimer, the term of this patent is extended or adjusted under 35 U.S.C. 154(b) by 201 days.

(21) Appl. No.: 18/455,809

(22) Filed: Aug. 25, 2023

(65) Prior Publication Data

US 2024/0081862 A1 Mar. 14, 2024

Related U.S. Application Data

(60) Provisional application No. 63/375,417, filed on Sep. 13, 2022.

(51) Int. Cl.
*A61B 17/34* (2006.01)
*A61B 90/92* (2016.01)
*A61F 9/007* (2006.01)
*A61B 17/00* (2006.01)

(52) U.S. Cl.
CPC ...... *A61B 17/3423* (2013.01); *A61B 17/3462* (2013.01); *A61B 90/92* (2016.02); *A61F 9/00736* (2013.01); *A61B 2017/00477* (2013.01)

(58) Field of Classification Search
CPC ............ A61B 17/3421; A61B 17/3423; A61B 17/3462; A61B 17/3498
See application file for complete search history.

(56) References Cited

U.S. PATENT DOCUMENTS

| | | | |
|---|---|---|---|
| 4,033,349 A | 7/1977 | Baehr | |
| 5,535,785 A * | 7/1996 | Werge | A61M 39/26 |
| | | | 251/149.6 |
| 5,817,099 A | 10/1998 | Skolik et al. | |
| 6,045,535 A | 4/2000 | Ben | |
| 6,740,064 B1 | 5/2004 | Sorrentino et al. | |
| 7,783,346 B2 | 8/2010 | Smith et al. | |
| 8,062,260 B2 | 11/2011 | McCawley | |
| 8,277,418 B2 | 10/2012 | Lopez | |
| 8,343,106 B2 | 1/2013 | Lopez et al. | |

(Continued)

FOREIGN PATENT DOCUMENTS

| | | |
|---|---|---|
| NL | 2010857 C2 | 11/2014 |
| WO | 2011087577 A1 | 7/2011 |

(Continued)

*Primary Examiner* — Diane D Yabut
(74) *Attorney, Agent, or Firm* — Patterson + Sheridan, LLP

(57) ABSTRACT

Certain embodiments herein disclose a cannula assembly. The cannula assembly comprises a cannula, having a proximal end and a distal end. The cannula comprises a head at the proximal end, the head having one or more wings. The cannula also comprises a hollow rod extending from the head to the distal end. The cannula assembly also comprises a hub couplable to the head and having a housing with an inner wall. The inner wall comprises an undercut, and one or more distal ends of the corresponding one or more wings are configured to fit into the undercut and couple the hub to the head upon insertion of the head into the hub.

9 Claims, 5 Drawing Sheets

(56) References Cited

U.S. PATENT DOCUMENTS

| | | |
|---|---|---|
| 8,679,064 B2 | 3/2014 | Lopez |
| 9,730,834 B2 | 8/2017 | Charles |
| 9,925,326 B2 | 3/2018 | Scheller |
| 10,905,462 B2 | 2/2021 | Ochoa |
| 11,166,843 B2 | 11/2021 | Hallen |
| 11,173,008 B2 | 11/2021 | Mirsepassi et al. |
| 11,395,713 B2 | 7/2022 | Grueebler et al. |
| 11,399,914 B2 | 8/2022 | Anderson et al. |
| 2003/0060770 A1* | 3/2003 | Wing ............... A61B 17/3496 604/164.02 |
| 2008/0097346 A1 | 4/2008 | Charles |
| 2008/0172009 A1 | 7/2008 | Attinger |
| 2008/0177239 A1 | 7/2008 | Li |
| 2008/0312662 A1 | 12/2008 | Hickingbotham |
| 2009/0076463 A1 | 3/2009 | Attinger |
| 2009/0270818 A1* | 10/2009 | Duke ............... A61B 17/3462 604/272 |
| 2014/0024899 A1* | 1/2014 | Kleyman ........... A61B 17/0218 600/204 |
| 2015/0151089 A1* | 6/2015 | Tan ................... A61M 25/0693 604/523 |
| 2017/0119360 A1* | 5/2017 | Hess ..................... A61B 90/08 |
| 2017/0119491 A1 | 5/2017 | Mirsepassi |
| 2018/0353326 A1* | 12/2018 | Hallen ............... A61B 17/3462 |
| 2019/0053825 A1 | 2/2019 | Ochoa |
| 2019/0239979 A1 | 8/2019 | Abt |
| 2019/0374248 A1 | 12/2019 | Grueebler |
| 2019/0374249 A1 | 12/2019 | Abt |
| 2020/0085615 A1 | 3/2020 | Abt |
| 2021/0204972 A1 | 7/2021 | Murakami |
| 2023/0021425 A1 | 1/2023 | Chon et al. |

FOREIGN PATENT DOCUMENTS

| | | |
|---|---|---|
| WO | 2017126565 A1 | 7/2017 |
| WO | 2019030587 A1 | 2/2019 |

\* cited by examiner

CANNULA ASSEMBLY

BACKGROUND

Surgical instruments may be used by surgeons during various eye surgeries for manipulation and/or removal of vitreous material, blood, scar tissue, or other matter. A surgeon may use several surgical instruments during an ophthalmic procedure, which may require that these instruments be inserted into and removed out of an incision repeatedly.

A cannula assembly, also referred to as a trocar cannula, may be inserted into an incision in the eye. Surgical instruments can then be inserted into the incision through the cannula assembly and the cannula assembly may protect the incision sidewall from repeated contact by the instruments. During ophthalmic surgeries, the eye, being a pressurized globe, may expel vitreous out of the cannula assembly when the cannula assembly is inserted into the eye if special precautions, such as use of a valved cannula assembly, are not taken.

Further, during surgery, it is desirable to enable the insertion of the cannula assembly into the eye while preventing pressurized fluid from escaping. Traditionally, the cannula assembly may be valved to prevent the loss of pressurized fluids through the cannula assembly as shown in prior art FIGS. 1A and 1B.

FIG. 1A is a schematic cross-sectional view of an eye 100 during an exemplary ophthalmic procedure, such as a vitrectomy. To insert cannula assembly 110, the distal end of a trocar blade, which is detachably coupled to the cannula assembly 110, creates a micro-incision in eye wall 102, such as in the pars plana 106. The cannula assembly 110 is then fully inserted through the micro-incision in the eye wall 102. After the cannula assembly 110 is inserted, the trocar blade is withdrawn through the micro-incision in the eye wall 102, and the cannula assembly 110 is left disposed through the eye wall 102. The cannula assembly 110 provides an interface for instrument exchange while, at the same time, providing a self-sealing valve to passively control fluid and pressure communication from inside and outside the eye 100. FIG. 1A shows an example of a cannula assembly 110 that is inserted in the eye wall 102, after the trocar blade is withdrawn.

FIG. 1B is an isolated top isometric view of the prior art cannula assembly 110 of FIG. 1A. The cannula assembly 110 includes a cannula 112 having a distal end configured to extend into the eye 100. Note that, as described herein, a distal end or portion of a component refers to the end or the portion that is closer to a patient's body during use thereof. On the other hand, a proximal end or portion of the component refers to the end or the portion that is distanced further away from the patient's body. In certain cases, the distal end of the cannula 112 has a thickness which resists insertion through the micro-incision created by the trocar blade, sometimes requiring an undesirably high insertion force to be applied to the cannula 112. A hub 114 is coupled to a proximal end of the cannula 112 and disposed outside the eye 100 and in contact with an outer surface of the eye wall 102 (shown in FIG. 1A). In certain cases, assembly of the cannula assembly 110 can be difficult. During assembly of the cannula assembly 110, clocking of the hub 114 is needed to precisely align the hub 114 with the cannula 112.

A valve septum 116 blocks an opening to a channel 118 (shown in phantom in FIG. 1B) of the cannula assembly 110. A slit 120 formed through the valve septum 116 permits access to the channel 118 for regulating fluid and pressure communication to and from the eye 100. In certain cases, the valve septum 116 has a flat top face 122 which is flush with a top face 124 of the hub 114. The flat valve septum 116 may resist instrument insertion through the slit 120, sometimes requiring an undesirably high insertion force to be applied to the instrument. The flat valve septum 116 also has the potential to leak when intraocular pressure exceeds ambient pressure. Moreover, the flat top face 122 of the valve septum 116, the top face 122 of the valve septum 116 being at the same level as the top face 124 of the hub 114, and translucent appearance of the valve septum 116 sometimes make it difficult to guide instruments to the center of the valve septum 116 complicating instrument insertion.

Therefore, there is a need for improved devices, systems, and methods providing an interface for instrument exchanges during ophthalmic surgery, and there is a particular need for improved cannula assemblies and methods.

SUMMARY

The present disclosure relates generally to cannula assemblies used during surgical operations, such as ophthalmic surgical operations.

Certain embodiments herein disclose a cannula assembly. The cannula assembly comprises a cannula, having a proximal end and a distal end. The cannula comprises a head at the proximal end, the head having one or more wings. The cannula also comprises a hollow rod extending from the head to the distal end. The cannula assembly also comprises a hub couplable to the head and having a housing with an inner wall. The inner wall comprises an undercut, and one or more distal ends of the corresponding one or more wings are configured to fit into the undercut and couple the hub to the head upon insertion of the head into the hub.

BRIEF DESCRIPTION OF THE DRAWINGS

The drawings described herein are for illustrative purposes only, are schematic in nature, and are intended to be exemplary rather than to limit the scope of the disclosure.

The above summary is not intended to represent every possible embodiment or every aspect of the subject disclosure. Rather, the foregoing summary is intended to exemplify some of the novel aspects and features disclosed herein. The above features and advantages, and other features and advantages of the subject disclosure, will be readily apparent from the following detailed description of representative embodiments and modes for carrying out the subject disclosure when taken in connection with the accompanying drawings and the appended claims.

DETAILED DESCRIPTION

Embodiments disclosed herein provide cannula assemblies for instrument exchange during ophthalmic surgery. In certain embodiments, a disclosed cannula assembly comprises a hub, which may be windowless, and a cannula. In certain embodiments, the hub comprises a groove or undercut (e.g., annular undercut) that allows for the cannula to be press-fit into the hub without precisely aligning the hub with the cannula. In certain embodiments, the hub comprises relief cutouts that are configured to prevent cracking when a housing of the hub is subject to high pressure. The relief cutouts may also function to disturb the flow of material during injection molding of the housing, thereby reducing the potential for merging separate flows causing instability or weakness in the housing.

Figure 1A:
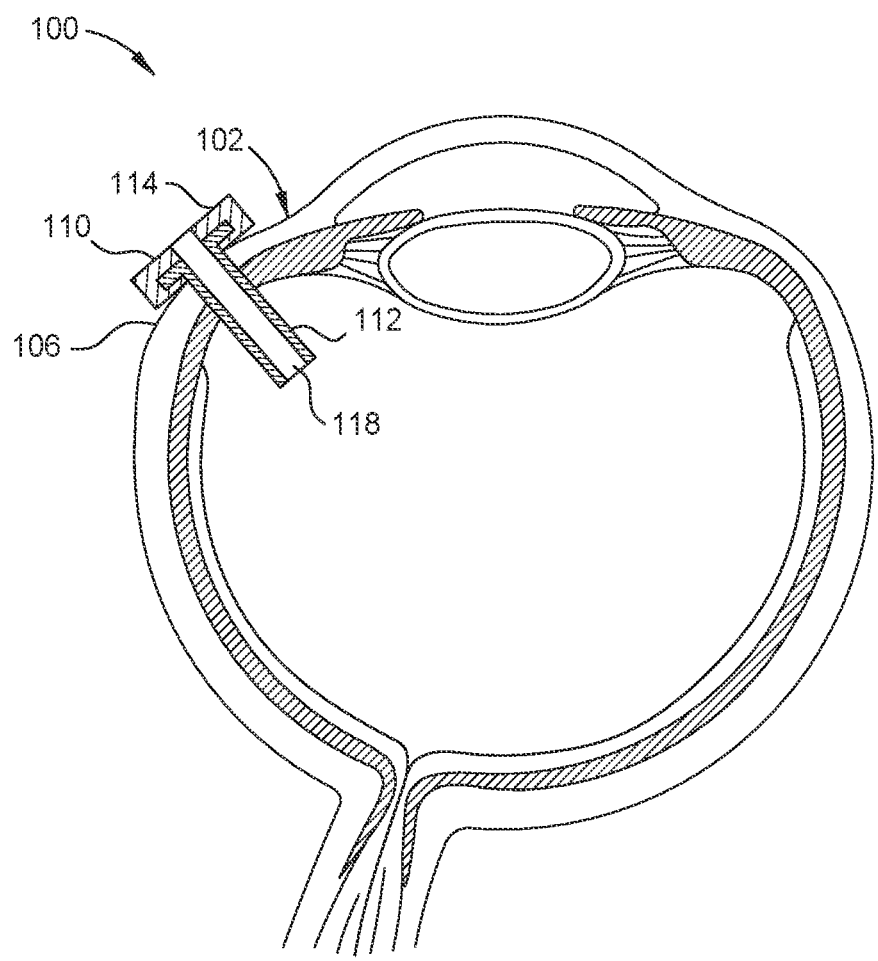
FIG. 1A is a prior art schematic cross-sectional view of an eye during an exemplary ophthalmic procedure.
Figure 1B:
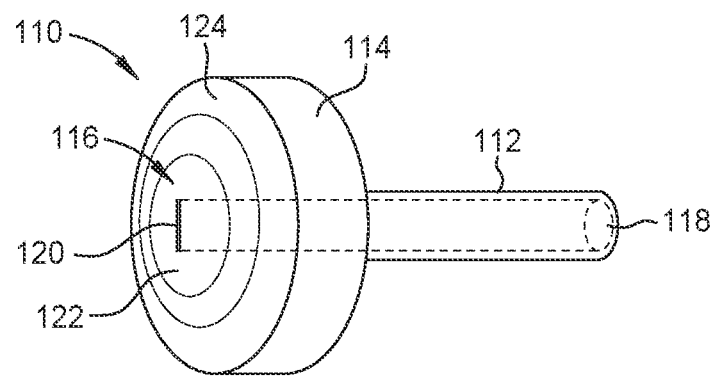
FIG. 1B is an isolated top isometric view of a cannula assembly of FIG. 1A.
Figure 2A:
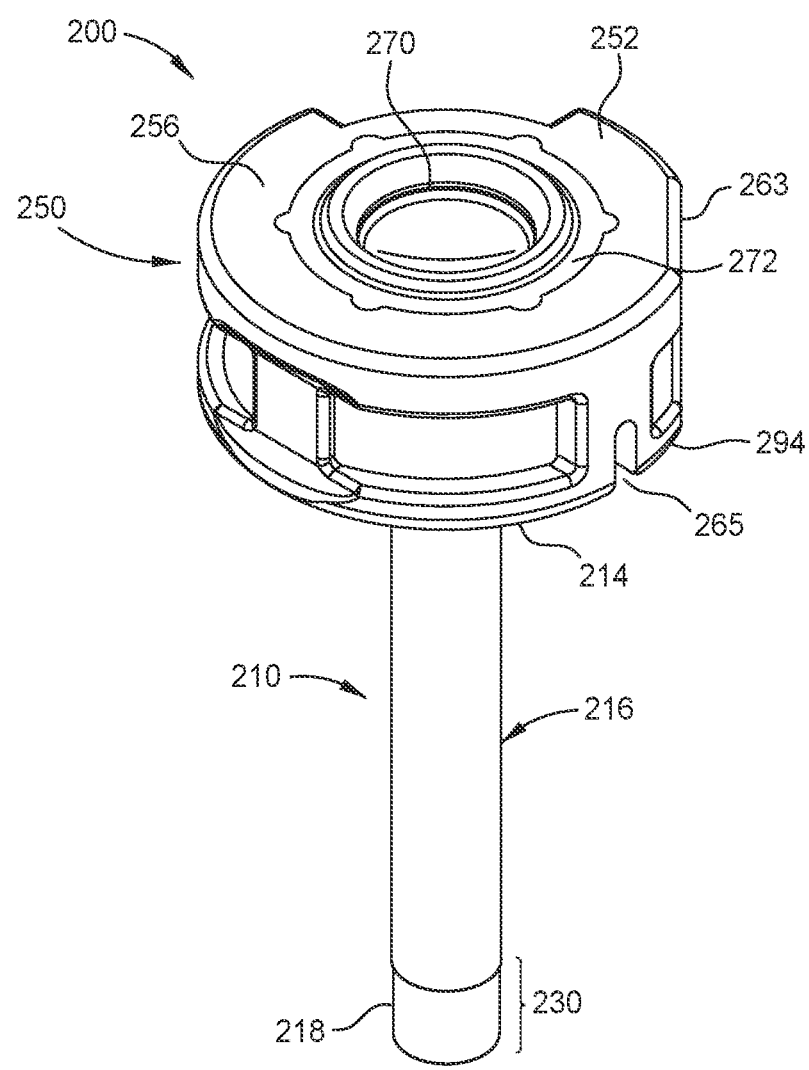
FIG. 2A shows an assembled view of an exemplary windowless cannula assembly, in accordance with certain embodiments of the present disclosure.
Figure 2B:
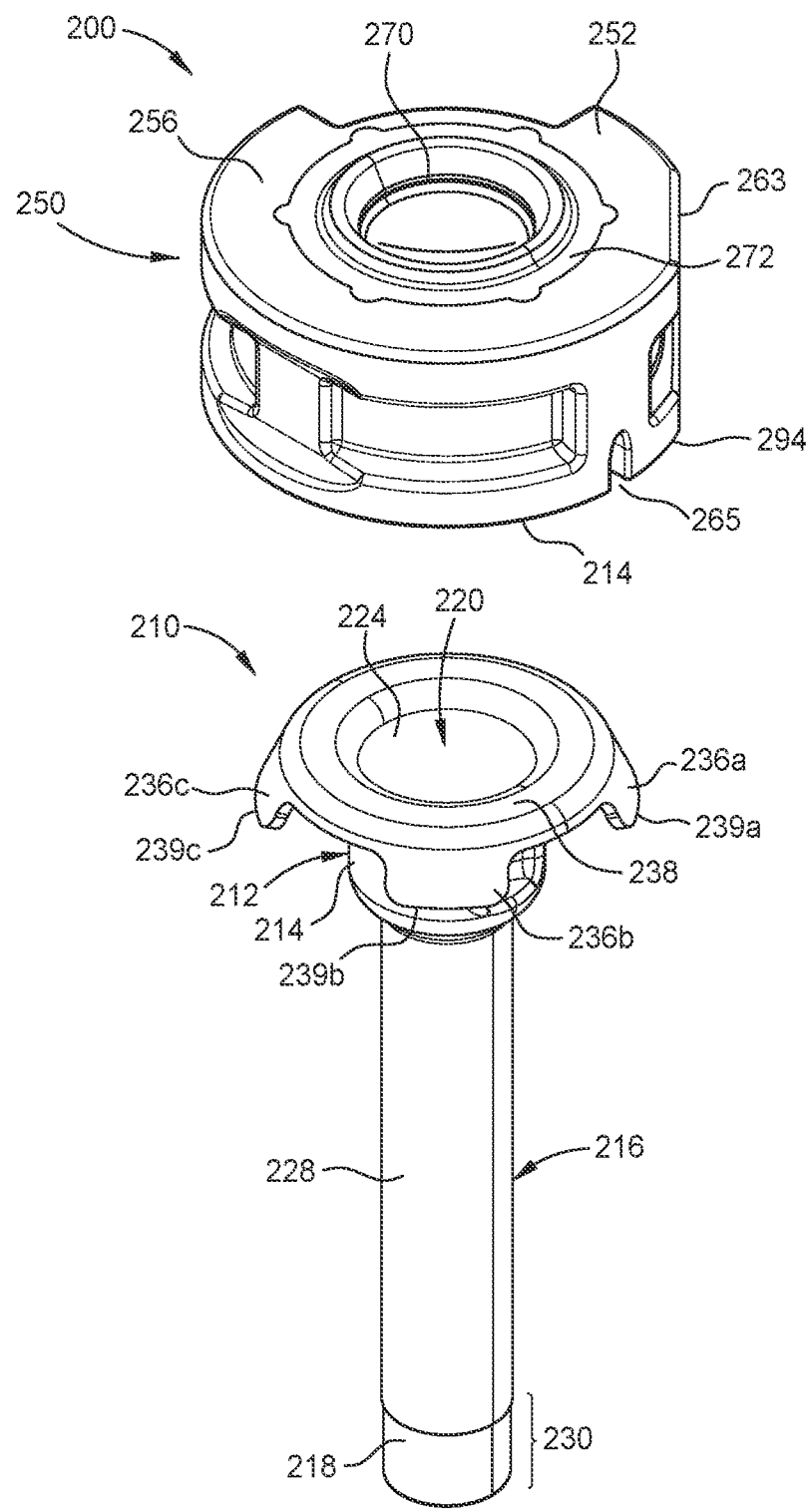
FIG. 2B shows an exploded view of the exemplary windowless cannula assembly of FIG. 2A, in accordance with certain embodiments of the present disclosure.
Figure 2C:
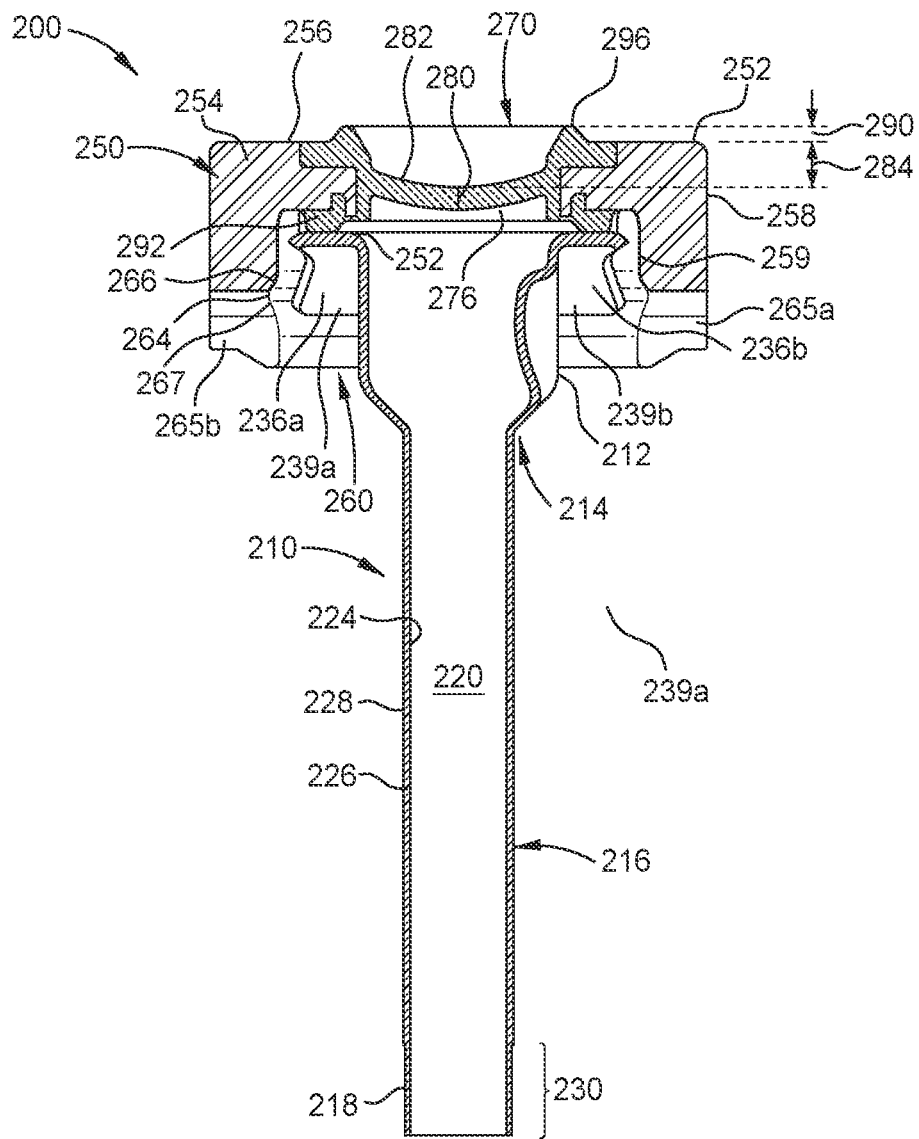
FIG. 2C shows a cross-sectional view of the assembled windowless cannula assembly of FIGS. 2A-2B, in accordance with certain embodiments of the present disclosure.

FIGS. 2A-2B are assembled and exploded top isometric views, respectively, of an exemplary windowless cannula assembly 200. FIG. 2C is a cross-sectional view of the assembled windowless cannula assembly 200 of FIGS. 2A-2B. FIGS. 2A-2C are, therefore, described together herein for clarity.

The windowless cannula assembly 200 generally includes a cannula 210 and a windowless valved hub ("windowless hub") 250 coupled or couplable to the cannula 210. The cannula 210 includes a cannula head ("head") 212 at a proximal end 214 of the cannula 210 and a hollow rod 216 extending from the head 212 to a distal end 218 of the cannula 210. Together, the head 212 and the hollow rod 216 form a working channel 220 through which various instruments can be inserted into the eye during an operation. The head 212 has an inner diameter that tapers down to match a smaller inner diameter of the hollow rod 216, for example, to help guide instruments into the hollow rod 216.

A wall 226 of the hollow rod 216 has an inner surface 224 surrounding the channel 220. A thickness of the wall 226 is measured radially from the inner surface 224 to an outer surface 228 of the wall 226. The hollow rod 216 has a thin-wall section 230 at the distal end 218. The thin-wall section 230 may be thinner compared to the distal end of conventional cannulas. Therefore, the thin-wall section 230 reduces the insertion force needed to insert the cannula 210 through the eye wall 102, which reduces potential for damage to the eye wall 102.

In the example of FIG. 2B, multiple wings 236 extend radially outward from the head 212. Although in FIG. 2B the head 212 comprises four wings 236, fewer or larger than four wings are also within the scope of this disclosure. An isometric view of the wings 236a-236c is shown in FIG. 2B while a cross-sectional view of wings 236a and 236b is shown in FIG. 2C. As shown, each wing 236 has a tip or a distal end 239 (e.g., distal end 239a-239c) that is configured to be received by and secured into internal undercut 264 in the inner wall 259 of a housing 252 of the windowless hub 250. For example, when assembling the windowless cannula assembly 200, the head 212 is disposed inside the windowless hub 250 and the wings 236 are press-fit to the undercut 264 in order to couple the windowless hub 250 to the head 212, as further described below.

The windowless hub 250 generally includes a housing 252 and a valve 270. When the windowless cannula assembly 200 is assembled, the housing 252 radially and at least partially surrounds the head 212 of the cannula 210. The housing 252 has a windowless, solid sidewall 258, which overall has a cylindrical shape. In particular, the sidewall 258 comprises a cylindrical portion, which constitutes the majority of the sidewall, as well as a flat or planar portion 263. The flat portion 263 may provide a starting or reference point for manufacturing and molding of the housing 252 and in assembly of the windowless cannula assembly 200. In particular, during manufacturing, the flat portion 263 may allow a manufacturing system to automatically identify the orientation of the windowless cannula assembly 200. The flat portion 263 also provides manufacturing systems with a reference point when aligning the windowless hub 250 with the cannula 210. Further, the flat portion 263 provides a reference point for the otherwise cylindrical shape of the windowless hub 250 and thereby prevents the windowless hub 250 from spinning in a nest or nested arrangement during production.

The housing 252 has an opening 260 in the bottom to receive the head 212 of the cannula 210 and a smaller opening in the top portion 254 to receive the valve 270. Note that a windowless cannula assembly refers to a cannula assembly with a solid housing 252, such that there are no openings or windows in the sidewall 258. In other words, in the embodiments shown in FIGS. 2A-3B, housing 252 has only two openings, a bottom opening 260 and a top opening for receiving the valve 270. The housing 252 does not have any openings on the sidewall 258. However, in certain other embodiments, one or more openings may be provided in in sidewall 258. In certain embodiments, the housing 252 is formed by injection molding. In certain embodiments, the housing 252 comprises a rigid polymer or plastic material, such as polycarbonate or polypropylene. In certain embodiments, the housing 252 may include one or more relief cutouts 265. The one or more relief cutouts 265 may be positioned at various angles and may be various sizes.

In the example of FIGS. 2A-3B, the windowless hub 250 comprises two relief cutouts 265, evenly spaced or symmetrically placed, at the bottom portion 294 of the windowless sidewall 258. However, generally, a fewer or larger number of relief cutouts 265 may be provided. Relief cutouts 265 are configured to prevent cracking when housing 252 is subject to high pressure. The relief cutouts 265 may also function to disturb the flow of material during injection molding, thereby reducing the potential for merging separate flows causing instability or weakness in the housing 252. For example, by including relief cutouts 265 in areas that tend to show weakness or susceptibility to cracking (also referred to as stress points), the relief cutouts 265 alter the flow of material in injection molding to ensure the flow fronts of material meet at a point where the housing 252 is not inherently weak or prone to cracking. In some embodiments, a stress point may be at the bottom of the curved sides of the windowless hub 250, for example.

Figure 3A:
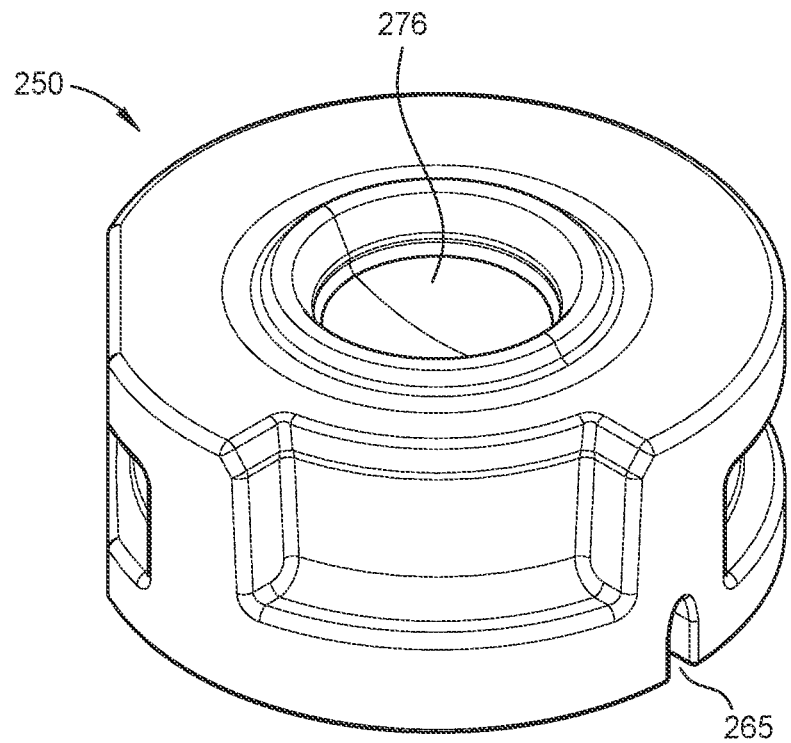
FIG. 3A is a view of the windowless hub of the windowless cannula assembly, in accordance with certain embodiments of the present disclosure.

As discussed, in the example of FIGS. 2A-3B the windowless hub 250 comprises two relief cutouts 265, one of which is shown in FIGS. 2A-2B and 3A. In FIGS. 2C and 3C, a cross-sectional view of both of the relief cutouts 265a-265b are shown. In some other embodiments, the windowless hub 250 comprises four relief cut-outs, which may be evenly spaced or symmetrically placed. It will be appreciated by those of skill in the art that the exemplified arrangements are but some of various arrangements of cutouts suitable to improve strength, reduce problematic material flow, or provide relief from structural stress, and that the cutouts may be sized, shaped, numbered, or configured differently without departing from the scope of this disclosure.

As shown in FIGS. 2C and 3C, an annular (e.g., 360 degree) internal groove or undercut 264 is provided in the inner wall 259 of the housing 252. Where undercut 264 is provided, the thickness of the sidewall 258 is reduced in relation to other portions of the sidewall 258. Note that having a solid, windowless sidewall 259 (e.g., without any openings) allows for providing an annular undercut 264. However, in certain embodiments an annular undercut 264 may be provided even in the presence of some openings in the sidewall 259, if the openings in the sidewall 259 are provided above or below where the undercut 264 is provided.

In certain embodiments, the shape of the undercut 264 conforms to the shape of the distal ends 239 of the wings 236 such that the distal ends 239 can be appropriately secured and fit into the undercut 264 as a result of press-fitting the cannula 210 to the windowless hub 250. For example, undercut 264 comprises at least two sides 266 and 267 and a circular central portion between the two sides 266 and 267. Side 266 is provided at an angle, in relation to the longitudinal axis of the cannula 210, that may be the same or substantially similar to the angle at which the wings 236 extend from the head 212. Side 267 is also shaped at an angle, in relation to the longitudinal axis of the cannula 210, to allow for the distal ends 239 to rest against the side 267 and to tightly couple the head 212 to the windowless hub 250. Once the cannula 210 is press-fit to the windowless hub 250, any force exerted to separate the two would cause the side 267 to exert opposite force on the distal ends 239 of the wings 236, thereby preventing the cannula 210 from de-coupling from the windowless hub 250. An annular undercut 264 allows for press-fitting the head 212 of the cannula 210 to the windowless hub 250 without having to clock the windowless hub 250 to precisely align the hub 250 with the cannula 210. In certain embodiments, the undercut 264 may not be annular. In other words, certain parts of the inner wall 259 may provide an undercut while other parts may be solid (i.e., without any reduced thickness).

The valve 270 is disposed in the housing 252. The valve 270 has a cylindrical body with a top flange 272. The shape of the valve 270 conforms to the profile of the top portion 254 of the housing 252 (including the shape of the opening 260). The valve 270 has a septum 276, which is concave in shape in relation to the top face 256 of the top portion 254. The septum 276 is configured to provide an opening 280 for an instrument. The concave septum 276 reduces the insertion force needed to insert an instrument through the opening 280, thereby making instrument insertion easier. The concave septum 276 also helps to physically guide instruments to the opening 280 at the center of the septum 276 making instrument insertion easier.

The top face 282 of the septum 276 is recessed a distance 284 from the top face 256 of the housing 252. The distance 284 of this recessed portion is measured from the top face 256 of the housing 252 to the top face 282 of the septum 276 at a radial center of the septum 276 along a longitudinal axis of the cannula 210. The distance 284 may be about 0.005 inches or greater, such as about 0.005 inches to about 0.02 inches, or such as about 0.01 inches. In contrast to conventional hubs in which a septum is flush with a top face, the recessed septum 276 of the windowless hub 250 helps physically guide instruments to the opening 280 at the center of the septum 276 making instrument insertion easier. In some embodiments, a ridge 296 may extend from the top portion of the periphery of the opening 280 a distance 290 and may also make instrument insertion easier.

In certain embodiments, the valve 270 comprises an elastic polymer, such as silicone. The material of the valve 270 is selected to help maintain an intraocular pressure of about 10 mmHg (millimeters of mercury) to about 25 mmHg. In certain embodiments, the valve 270 is over molded onto the housing 252. In some other embodiments, the valve 270 is formed separately from and subsequently coupled together with the housing 252.

An annular seal 292 that contacts the top face 238 of the head 212, when the windowless cannula assembly 200 is assembled, is provided in order to effect an air- and fluid-tight seal between the cannula 310 and the windowless hub 250. In the example of FIGS. 2A-2C, the seal 292 is integral with the valve 270. In some other embodiments, the seal 292 may be formed separately from the valve 270 and over molded onto or coupled to the housing 252.

In certain embodiments, the color of the housing 252 is different from the color of the valve 270 to provide a visual contrast between the housing 252 and the valve 270. For example, the housing 252 may be non-colored, such as the color of natural polycarbonate, whereas the valve 270 may be colored. In certain embodiments, the housing 252 may have a more translucent appearance than the valve 270. Compared to conventional hubs which have a translucent septum, the visual contrast provided by the color of the valve 270 helps provide visual guidance to the opening 280 at the center of the septum 276 making instrument insertion easier.

Figure 3B:
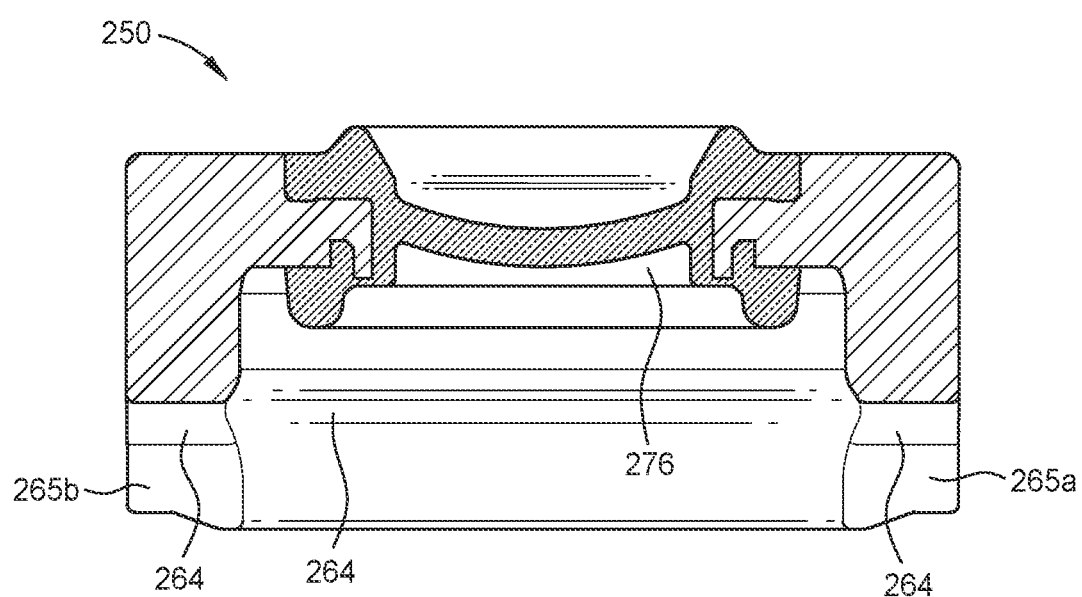
FIG. 3B is a cross-sectional view of the windowless hub of the windowless cannula assembly of FIG. 3A, in accordance with certain embodiments of the present disclosure.

FIGS. 3A-3B are additional exemplary views of the windowless hub 250 as described relative to FIGS. 2A-2C. FIGS. 3A-3B are top isometric and cross-sectional views, respectively, of the windowless hub 250.

What is claimed is:

1. A cannula assembly, comprising:
   a cannula having a proximal end and a distal end, the cannula comprising:
      a head at the proximal end, the head having one or more wings, and
      a hollow rod extending from the head to the distal end; and
   a hub couplable to the head and having a housing with an inner wall comprising a windowless, cylindrical sidewall of the hub, wherein:
      the inner wall comprises an undercut formed as an annular internal groove in the cylindrical sidewall extending substantially 360 degrees around the cylindrical sidewall, and
      one or more distal ends of the corresponding one or more wings are configured to fit into the undercut for coupling the hub to the head upon insertion of the head into the hub;
      wherein the one or more distal ends of the corresponding one or more wings are configured to fit into the undercut upon the head being inserted into the hub without the one or more wings having to be clocked relative to the undercut due to the substantially 360 degrees of the undercut; and
      wherein once the one or more wings are received by the undercut, any force exerted to separate the head from the hub would result in an opposite force being exerted on the one or more wings by the undercut to inhibit decoupling of the cannula from the hub.

2. The cannula assembly of claim 1, wherein the housing of the hub comprises one or more relief cutouts configured to inhibit cracking of the hub when the hub is subjected to pressure.

3. The cannula assembly of claim 2, wherein the one or more relief cutouts comprise two to four cutouts disposed on a bottom portion of the housing.

4. The cannula assembly of claim 3, wherein the two to four cutouts are evenly spaced on the bottom portion of the housing.

5. The cannula assembly of claim 1, wherein the hub comprises a concave septum in relation to a top portion of the hub.

6. The cannula assembly of claim 1, wherein a wall of the cannula has a first thickness at the distal end and a second thickness at one or more other portions of the cannula, the first thickness being different than the second thickness.

7. The cannula assembly of claim 1, wherein the hub comprises:
   a housing with a first color; and
   a valve disposed in the housing, the valve having a second color different from the first color.

8. The cannula assembly of claim 1, wherein the hub comprises a planar portion connected to the cylindrical sidewall.

9. The cannula assembly of claim 1, wherein a shape of the undercut is configured to conform to a shape of the one or more distal ends of the corresponding one or more wings.

* * * * *